United States Patent
Brot et al.

(10) Patent No.: US 9,168,995 B2
(45) Date of Patent: Oct. 27, 2015

(54) FLIGHT CONTROL SYSTEM USING SIMPLEX COMPUTERS AND AIRCRAFT COMPRISING SAME

(71) Applicant: Airbus Operations (SAS), Toulouse (FR)

(72) Inventors: Patrice Brot, Ramonville Saint-Agne (FR); Sylvain Devineau, Toulouse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 7 days.

(21) Appl. No.: 14/044,035

(22) Filed: Oct. 2, 2013

(65) Prior Publication Data

US 2014/0100718 A1  Apr. 10, 2014

(30) Foreign Application Priority Data

Oct. 5, 2012  (FR) ................................. 12 59507

(51) Int. Cl.
*B64C 13/50* (2006.01)
*G05D 1/00* (2006.01)
*B64C 19/00* (2006.01)
*B64C 1/00* (2006.01)

(52) U.S. Cl.
CPC ................. *B64C 1/00* (2013.01); *B64C 13/503* (2013.01); *G05D 1/0077* (2013.01)

(58) Field of Classification Search
CPC ............................ B64C 13/503; G05D 1/0077

USPC ............................................................. 701/3
See application file for complete search history.

(56) References Cited

U.S. PATENT DOCUMENTS

| 8,015,390 | B1 | 9/2011 | Corcoran et al. |
| 8,690,101 | B2 * | 4/2014 | Ahmad et al. ............... 244/99.4 |
| 2007/0083301 | A1 | 4/2007 | Yeh |
| 2008/0022151 | A1 | 1/2008 | Stange et al. |
| 2009/0012657 | A1 | 1/2009 | Knotts et al. |
| 2011/0066305 | A1 | 3/2011 | Lin et al. |
| 2011/0276199 | A1 | 11/2011 | Brot |

FOREIGN PATENT DOCUMENTS

WO  2008122820  10/2008

OTHER PUBLICATIONS

Goupil, "AIRBUS State of the Art and Practices on FDI and FTC in Flight Control System", Control Engineering Practice 19(6), (Jun. 2011), pp. 524-539.*
French Search Report, Jun. 21, 2013.

* cited by examiner

*Primary Examiner* — John R Olszewski
*Assistant Examiner* — Todd Melton
(74) *Attorney, Agent, or Firm* — Greer, Burns & Crain, Ltd.

(57) ABSTRACT

A system for computing flight commands, which comprises simplex computers coupled to form virtual command/monitor pairs. These virtual pairs send the commands computed to actuators whose controller implements an election of the pair whose command will be taken into account by the actuator.

20 Claims, 4 Drawing Sheets

FLIGHT CONTROL SYSTEM USING SIMPLEX COMPUTERS AND AIRCRAFT COMPRISING SAME

CROSS-REFERENCES TO RELATED APPLICATIONS

This application claims the benefit of the French patent application No. 12 59507 filed on Oct. 5, 2012, the entire disclosures of which are incorporated herein by way of reference.

BACKGROUND OF THE INVENTION

The present invention relates to flight control systems present in aircraft.

These flight control systems are at the interface between the piloting members (stick, rudder bar, etc.) and the various movable flight surfaces of the aircraft (such as the rudders, elevators, ailerons, stabilizers, etc.).

Modern airliners possess flight control systems of "fly by wire" type in which the mechanical actions on the piloting members are converted into signals transmitted to actuators controlling the displacement of the flight surfaces, these orders being transmitted to the actuators by advanced computers.

These orders are computed according to several types of flight laws. One of these laws, called the normal law, is an assisted piloting law which reprocesses the piloting setpoints provided by the piloting members so as to optimize the piloting conditions (comfort of the passengers, stabilization of the aircraft, protection of the flight domain, etc.). Another law, termed the direct law, is a law which merely retranscribes the aircraft displacement instructions transmitted by the electric flight controls without reprocessing these signals aimed at improving piloting performance.

As illustrated in FIG. 1, a flight control system 1 is already known, comprising a control module 2 exhibiting two sets of computers 4 and 5 so as to determine the control orders to be transmitted to actuators 3. These computers are duplex computers, that is to say they comprise two computation units, one unit operating in command mode while the second typically performs the same computations in monitor mode.

The set 4 comprises two computers 4-1 and 4-2 capable of computing the command of the actuators 3 which is established according to the normal and direct control laws (these computers are called primary computers) and a computer 4-3 solely capable of computing this command established according to the direct law (this computer is called the secondary computer).

The set 5 comprises a primary computer 5-1 and two secondary computers 5-2 and 5-3.

All these computers are installed in an avionics bay and communicate with the actuators via direct analogue point-to-point links.

The actuators are linked to one or two computers, with, in the case of two computers, a "master/standby" architecture, the master computer ensures the validity of the control signal transmitted to the actuator, thereby ensuring the integrity of the device. When the master computer develops a fault, the "on-standby" computer takes over, thereby ensuring that a computer is always available.

To ensure the validity of its order, each computer exhibits a structure with dual computation units (these are dual-channel computers also referred to as "duplex" computers), which is not illustrated in FIG. 1.

The first unit is a control unit (COM) which implements the processing operations required for carrying out the functions of the computer, namely determining a control signal to an actuator.

The second unit is a monitoring or surveillance unit (MON) which for its part performs the same types of operations, the values obtained by each unit then being compared and, if there is a discrepancy which exceeds the permitted tolerance threshold, the computer is automatically deactivated. It then becomes inoperative and is declared faulty so that another computer can substitute for it so as to implement the functions relinquished by this faulty computer.

Each computer is thus designed to detect its own faults and disable the corresponding outputs while signaling its state.

The hardware of the primary and secondary computers is different so as to minimize the risks of simultaneous failure of the whole set of computers (hardware dissimilarity).

Moreover, the hardware of the two channels, control and monitor or COM/MON, of each computer is identical but for safety reasons, the software of these two channels is different so as to ensure software dissimilarity.

The architecture of a known duplex computer, that is to say one composed of two computation units, operating in command/monitor mode is illustrated by FIG. 2. The first unit 2.1 is the control unit, whereas the second unit 2.2 is the monitoring unit. These two units are based on one and the same hardware. This hardware is typically composed of an electrical power supply 2.11, 2.21 receiving the energy required for its operation. A communication bus allows the exchange of data between a processor 2.12, 2.22 charged with the computations and a work memory 2.13, 2.23. This memory makes it possible on the one hand to store the programs carrying out the various computing functions required, typically the functions implementing the various laws, normal law or alternative law (alternate) and/or direct law which are used to control the flight surfaces. An input output module 2.15, 2.25 makes it possible to exchange data with the other computers. It also makes it possible to receive the data, typically position data, originating from the airfoils and the setpoints emanating from the piloting members. A watchdog makes it possible to exit from a software lockup through a resetting of the unit. The output unit also makes it possible to send the result of a command to the actuator of an airfoil. This sending is controlled by the relays 2.16 and 2.26 which make it possible to block the sending of a command when the computer is determined as being non-operational.

This computer operates according to the following principle. The control unit carries out the computation of the commands to be sent to an airfoil as a function of the setpoints received from the piloting members. This computation is carried out according to the law which is active for the computer. The associated monitoring unit carries out the same computation on the basis of the same data, using the same law. The computation is carried out by a different item of software implementing the same law so as to comply with the principle of software dissimilarity. The command computed must therefore be the same within the limits of rounding errors or other minor divergences introduced through the use of two different items of software. The result obtained by the control unit and that obtained by the monitoring unit are therefore compared and their difference is tested against a tolerance threshold. If the difference is greater than this tolerance threshold, the computer is declared non-operational and its outputs are deactivated. Another computer operating according to the same principle is then activated to take over control of the airfoil. It is noted that both units of the computer are deactivated while the fault usually affects only one of these two units. The availability of the system is ensured through the redundancy of the computers involving high redundancy in terms of computation units.

The architecture proposed is based on a set of flight control computers, or FCC, of the simplex type, that is to say which are composed of a single processing unit, rather than of two processing units. These computers allow the control of actuators acting on the airfoils. These actuators are controlled locally by a control unit called the FCRM (Flight Control Remote Module). These FCRMs are architectured according to the command/monitor model described above. They therefore consist of a control unit and of a monitoring unit. The control unit physically drives the actuator. The monitor duplicates the computations carried out by the control unit. The results of the two units are compared and in case of divergence, the actuator is deactivated. Typically, in this case a damped mode of operation of the actuator is forced. In this mode, the actuator plays the role of a passive damper on the airfoil. These remote controllers are involved in the control logic and therefore require this redundancy in order to ensure the safety level required.

The communication between the computers and the actuators is ensured by digital data buses. It is possible to use, for example, buses in a data network, such as an AFDX™ data network which is a bus and network developed by European avionics industries for Airbus, or a bus such as described in specification MIL-STD-1553 used in military avionics. Advantageously, each computer is linked by such a bus, or a set of such buses, to each actuator.

Certain of the computers are endowed with advanced functions, typically they are capable of computing the airfoil commands in accordance with the whole set of flight laws available. These computers are dubbed primary computers. They are used in priority. Other computers are endowed with simpler functions. Typically they are capable only of the direct law where the setpoints received from the piloting members are transmitted directly to the actuators. These computers are dubbed secondary and are typically used when all or some of the primary computers are non-operational. Advantageously, the various primary computers are endowed with different software ensuring the same functions so as to achieve software dissimilarity of the system. The secondary computers may be endowed with the same software which will nevertheless advantageously be dissimilar from the software used by the primary computer.

The safety afforded in the prior art by the use of duplex command/monitor computers is afforded in the architecture proposed through the definition of logic computer pairs used in command/monitor mode. Typically each computer participates in two command/monitor pairs. For one of the pairs it acts in command mode. For the other pair, it acts in monitor mode. Thus, typically, as many command/monitor pairs as computers involved are implemented. Each computation is then performed twice by each computer, a first time in command mode on behalf of the first command/monitor pair and a second time in monitor mode for the second command/monitor pair. This done, a fault with a computer invalidates the command/monitor pairs in which it participates, but the other computers continue to be active and used within the remaining command/monitor pairs. This approach is in contradistinction to the prior art where a fault with a unit of a duplex computer brings about the deactivation of the entire computer and hence of the second unit.

SUMMARY OF THE INVENTION

The invention is aimed at providing a flight control system which exhibits a modified architecture with respect to that of the prior art described above, which is at one and the same time less expensive in terms of hardware resources and software resources while meeting the same safety and availability requirements as the system of the prior art.

The subject of the invention is thus a computer for computing flight commands within a flight control system, which comprises at least one item of software for computing flight commands according to at least one flight law on the basis of at least one command received from at least one piloting member; means of communication with at least two other associated computers of the same type; means for computing a first flight order, intended for a remote controller of an airfoil actuator, in command mode within a first virtual command/monitor pair consisting of said computer and of one of the two associated computers acting in monitor mode on behalf of said first virtual command/monitor pair and means for computing a second flight order, intended for a remote controller of an airfoil actuator, in monitor mode within a second virtual command/monitor pair consisting of said computer and of the other associated computer acting in command mode on behalf of said second virtual command/monitor pair.

According to a particular mode of the invention, the computer furthermore comprises means for verifying the validity of the virtual command/monitor pairs according to the following criteria; the commands computed by the two computers of the pair are available and computed according to the same flight law and the difference in absolute value between the two commands computed is less than a given tolerance threshold.

According to a particular mode of the invention, the means for verifying the validity of the virtual command/monitor pairs furthermore verify the following criterion: the two computers implement a different item of software for the computation of the commands.

According to a particular mode of the invention, the computer furthermore comprises: means for transmitting to all the other computers of the system, and for each of the pairs in which it participates, its information regarding validity of the pair.

According to a particular mode of the invention, the computer furthermore comprises means for electing a master pair from among the set of computers participating in the flight control system.

According to a particular mode of the invention, the pair elected master is the first valid pair, that is to say determined as valid by the two computers of the pair, in a list of all the pairs of the system, ranked in an order of priority.

According to a particular mode of the invention, the computer furthermore comprises means for selecting a level of flight law for the pair as being the most degraded level of law of the best levels of law of which the two computers of the pair are capable.

According to a particular mode of the invention, the computer furthermore comprises means for transmitting the level of law selected for each of the pairs in which it participates to all the computers and where the means of election are adapted for electing as master pair the first pair having the least degraded law in a list of all the pairs of the system, ranked in an order of priority.

According to a particular mode of the invention, the computer furthermore comprises means of software reconfiguration for switching from a first item of software to a second different item of software for the computation of the flight commands.

According to a particular mode of the invention, the computer furthermore comprises, if it is the computer acting in command mode of the pair elected master, means for transmitting the commands computed to the whole set of computers and means for retransmitting to the remote controller controlling an actuator, the commands received computed by the computer acting in command mode of the pair elected master.

According to a particular mode of the invention, the computer furthermore comprises, if it is the computer acting in command mode of the pair elected master, means for transmitting the output of an integrator used for the computation of the normal law and means for synchronizing the integrators used for the computation of the normal law in command mode for a pair not elected master or in monitor mode to the value of the integrator of the computer acting in command mode of the pair elected master.

The subject of the invention is also a controller of an airfoil actuator within a flight control system, which comprises means for receiving from each computer of a set of computers organized as command/monitor pairs the command computed by said computer and the result of the election of a pair as master pair; means for determining, from among the election results received, the master pair viewed by said controller and means for applying to the airfoil the command received by the computer acting in command mode within the master pair viewed by said controller.

According to a particular mode of the invention, the means for determining the master pair comprise means for selecting the master pair most often cited in the election results received, an order of priority deciding between possible equally ranked pairs According to a particular mode of the invention, the controller furthermore comprises means for receiving the commands computed by the computer acting in command mode within the master pair on the part of each of the computers and means for applying to the actuator the command thus received from one of the other computers in case of loss of connection with the computer acting in command mode within the master pair.

According to a particular mode of the invention, the command applied is the median value of the commands thus received from the other computers in case of loss of connection with the computer acting in command mode within the master pair.

According to a particular mode of the invention, the controller comprises two units forming a command/monitor pair.

The subject of the invention is also a flight control system characterized in that it comprises at least one computer and at least one controller of an airfoil actuator according to the invention.

The subject of the invention is also an aircraft characterized in that it comprises a flight control system according to the invention.

BRIEF DESCRIPTION OF THE DRAWINGS

Other advantages, aims and characteristics of the present invention will emerge from the detailed description which follows, given by way of non-limiting example, in regard to the appended drawings in which.

DETAILED DESCRIPTION OF THE PREFERRED EMBODIMENTS

Figure 1:
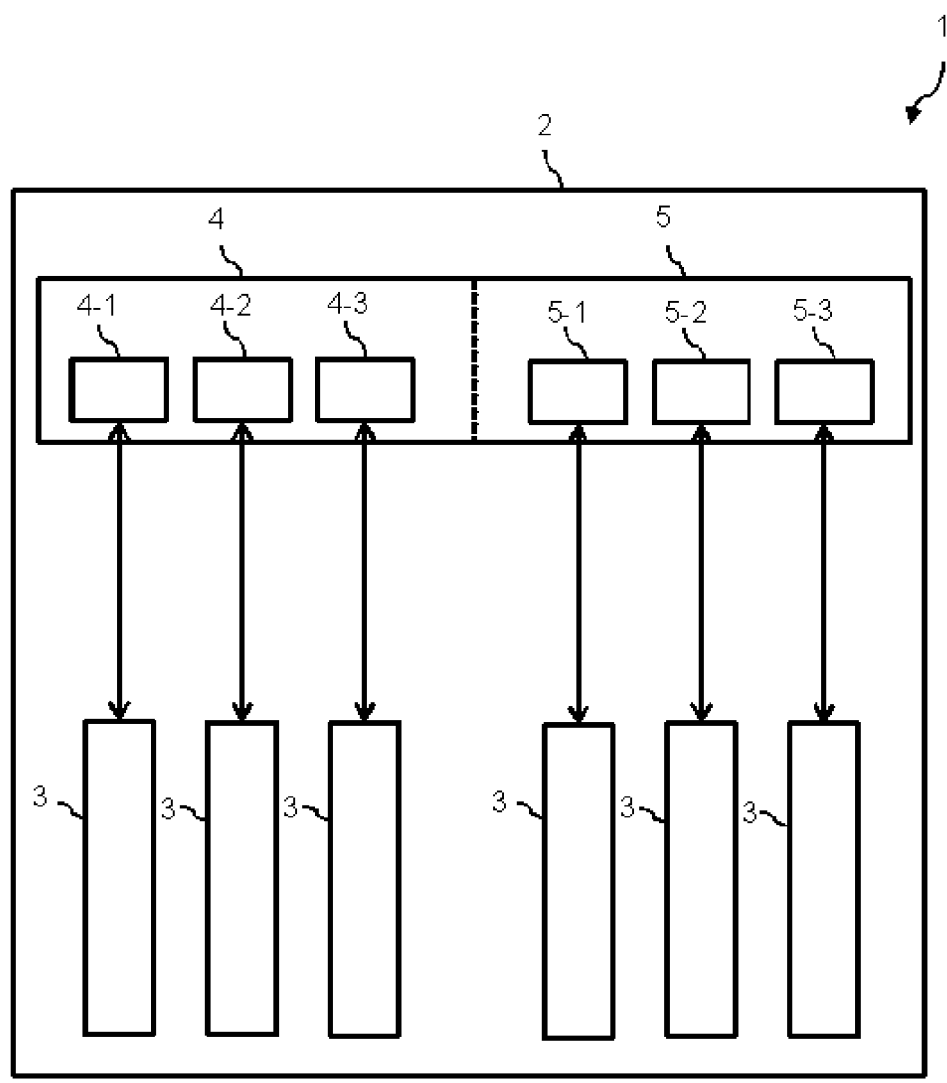
FIG. 1 illustrates a flight control architecture according to the prior art.
Figure 2:
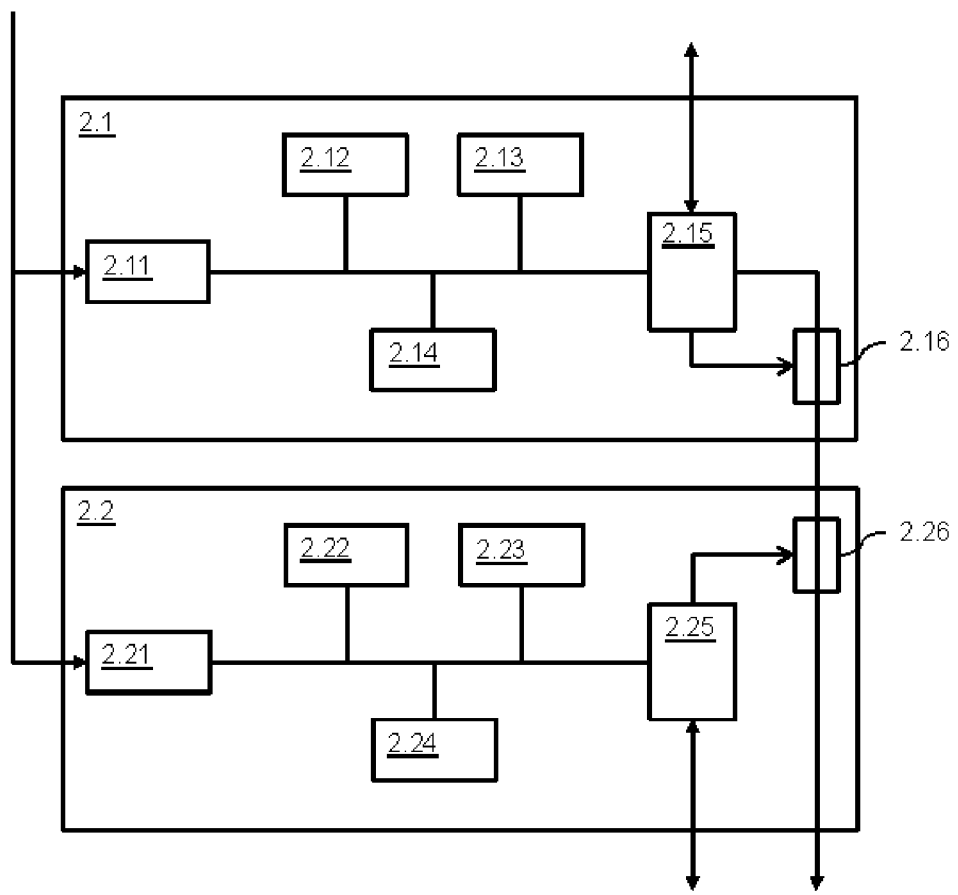
FIG. 2 illustrates the architecture of a command/monitor duplex computer according to the prior art.
Figure 3:
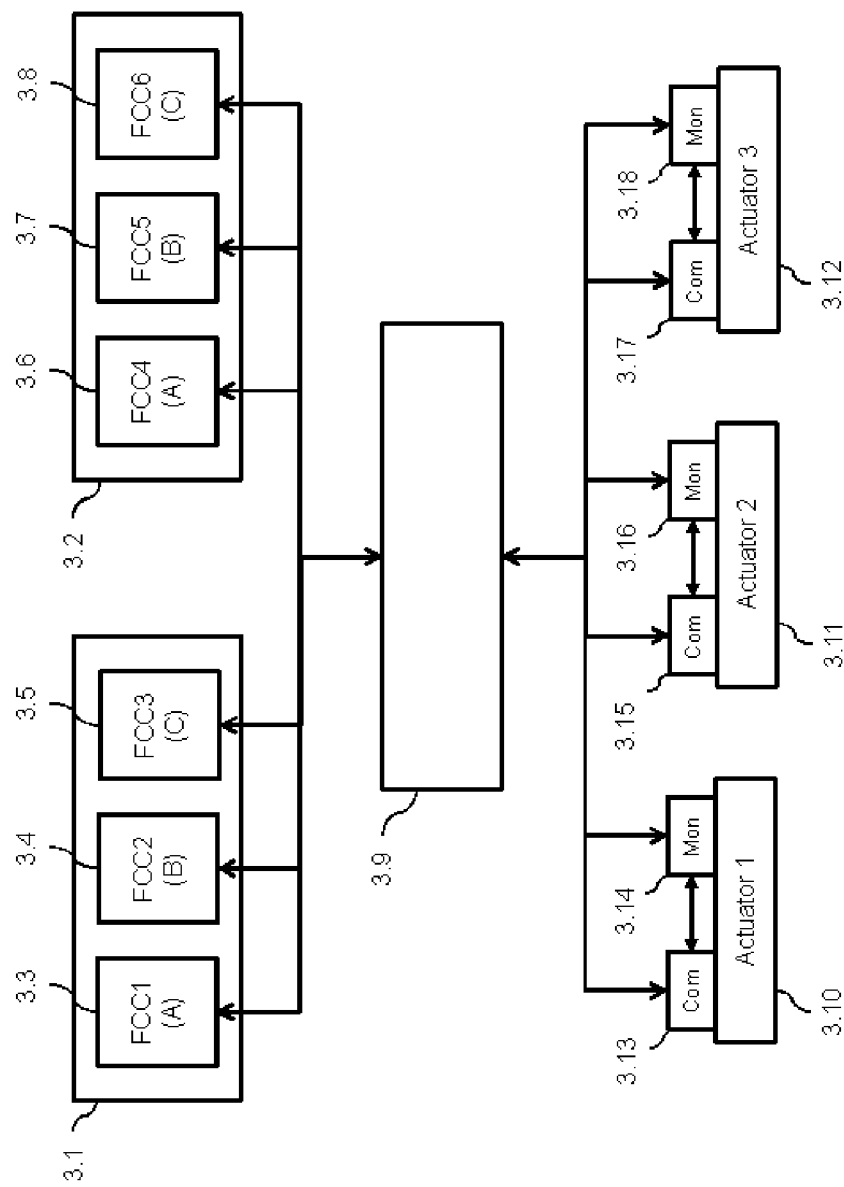
FIG. 3 presents an exemplary embodiment of a flight control architecture according to the invention.

An exemplary embodiment of the invention is now described in conjunction with FIG. 3. In this example, the computers are distributed into two groups 3.1 and 3.2. Each group consists of two primary computers 3.3, 3.4, 3.6 and 3.7 and of a secondary computer 3.5 and 3.8. The software used by each computer is symbolized by the letter between parentheses. The primary computers 3.3 and 3.6 execute a first item of software, called "A", which implements the whole set of laws available. The primary computers 3.4 and 3.7 execute a second item of software, called "B", which also implements the whole set of laws available. The secondary computers 3.5 and 3.8 execute a third item of software, called "C" which implements only the direct law.

Each actuator, 3.10, 3.11 and 3.12 is driven by a remote drive unit consisting of a control unit 3.13, 3.15 and 3.17 and a monitor unit 3.14, 3.16 and 3.18. Each of these drive units is connected to each of the computers by an advantageously duplicated bus 3.9 consisting of a bus used in an AFDX™ data network or a bus described in military standard MIL-STD-1553.

The role of the computers is to compute the commands to be sent to the airfoils on the basis of the information received from the piloting members and current flight parameters. This computation obeys one law from among a set of possible laws. By default, the computation is performed according to a law termed the normal law. The other laws are implemented to cope with a degradation of the available information, for example in case of loss of certain flight parameters following possible faults with the facilities providing its parameters. A succession of laws are therefore implemented to alleviate an ever more significant degradation of the available parameters. As a last resort, a so-called direct law transmits the commands obtained from the piloting members directly to the actuators, the piloting then being entirely controlled by the pilot without modification.

The four primary computers of the exemplary embodiment are organized to form four command/monitor pairs. These four pairs are in the example the pairs (FCC1, FCC5), (FCC2, FCC1), (FCC4, FCC2) and (FCC5, FCC4). The first computer of the pair acting in command mode and the second in monitor mode. It is noted that each computer participates in two pairs, once as control unit and once as monitoring unit. It is also noted that the control and monitoring units of each pair do indeed achieve software dissimilarity. The secondary computers form a particular command/monitor pair the pair (FCC3, FCC6). Each computer pair can be viewed as a virtual command/monitor duplex computer. These pairs are given by way of example. Other pairs may be formed by permutation and as a function of the number of computers implemented in a particular solution.

Each pair is advantageously furnished with a state of validity computed by each computer of the pair. According to the exemplary embodiment, a computer of the pair determines the validity of this pair according to the following criteria:

The other computer is perceived to be valid.

The two computers implement different software.

The commands computed by the two computers are available and computed according to the same flight law.

The difference in absolute value between the two commands computed is less than the tolerance threshold.

Advantageously, each computer transmits to all the other computers and for each of the pairs in which it participates, its information regarding validity of the pair and the commands computed for this pair. Thus, each computer is informed of the state of validity of the other computers.

Advantageously, a pair is elected master. It is the commands of this master pair that will normally be taken into account for the control of the actuator. This election is carried out by each of the computers according to an election procedure normally culminating in the election of one and the same master pair by each of the computers. It may be otherwise in certain cases of fault. To do this, an order of priority is advantageously determined in the set of pairs. For example, the pairs receive a decreasing priority in the order (FCC1, FCC5), (FCC2, FCC1), (FCC4, FCC2) and (FCC5, FCC4). The master pair is determined, for example as the first of these pairs which is valid. The expression valid pair is intended to mean a pair both of whose entities have determined that the pair is valid. If none of these pairs is valid, the pair of secondary computers (FCC3, FCC6) is declared master if it is valid. This affords the advantage that all the valid computers have the same picture of the system.

Normally all the computers elect the same master pair. However, certain configurations of faults may lead to a heterogeneity in the result of the election. The remote controllers which receive the election result computed by the pair elected, on the part of all the computers must therefore be capable of determining a command/monitor computer pair from among the, potentially different, pairs elected that they receive from the various computers. To do this, for example, each remote controller unit selects the master pair most often cited among the master pairs elected which it receives on the part of the various computers. If several pairs are cited as many times, then a choice is made in order of priority according to the order already defined (FCC1, FCC5), (FCC2, FCC1), (FCC4, FCC2), (FCC5, FCC4) and finally the pair (FCC3, FCC6). When no computer validates any command/monitor pair, the remote controller selects, in order, FCC3 if it is valid and then FCC6 if it is valid. The direct law is then applied. The control unit of the remote controller then applies the command computed by the control computer of the pair, selected and received from the latter, to the actuator that it controls.

Each computer is capable of carrying out a flight law set ranging from the normal law executed when all the flight parameters are available to the most degraded law, the direct law. It may happen that the two computers of a command/monitor pair do not select the same level of law in certain degraded cases. Advantageously, the computers of one and the same command/monitor pair exchange the best level of law of which they are capable in their current environment. The level of law selected for the pair is the level of law which is the most degraded of the two. Each computer agrees in computing the flight commands with the aid of this law selected for the pair. One and the same computer can then be made to compute an airfoil command according to a first law for a first pair and according to a second law for a second pair as a function of the laws selected in each pair.

Advantageously, the computers exchange between themselves the level of law selected for each of the pairs. The selection of the master computer pair is then modified in the following manner. A score is allocated to each pair as a function of the level of law selected for this pair. This score is decreasing for ever more degraded levels of law. This score is then increased by a value depending on the order of priority already defined to decide between equivalent scores. The master pair selected is then the pair obtaining the best score.

In the exemplary embodiment a score of 30 is allocated to a computer that can operate according to the normal law, a score of 20 for those that can operate according to the so-called alternative law 1, a score of 10 for the alternative law 2 and a score of 0 for the direct law. This score is increased by a value of 6 for the pair (FCC1, FCC5), by 5 for the pair (FCC2, FCC1), by 4 for the pair (FCC4, FCC2) and by 3 for the pair (FCC5, FCC4). Thus, the master pair of highest priority is selected from among the pairs that selected the least degraded law. Hence, a computation of the commands according to the least degraded law available is always selected.

When all the primary computers using the same software are non-operational, it is no longer possible to form command/monitor pairs with the aid of the primary computers remaining, at least while complying with the constraint of software dissimilarity. Advantageously, at least certain computers are endowed with means of software reconfiguration. These computers accommodate both software versions and are capable of operating according to one or the other. Switchover can be instigated by these reconfiguration means. When only primary computers based on the same type of software are valid, the reconfiguration of certain of them to use the alternative version of software makes it possible to reconstruct command/monitor pairs complying with the software dissimilarity constraint. In the exemplary embodiment, FCC2 and FCC4 are thus endowed with reconfiguration means. This choice is arbitrary. Thus, the moment at which it is necessary to switch to the second computers and use the direct law is delayed.

Following a specific wiring fault, it is possible that a remote controller may correctly identify the master computer, but that the communication with the latter is lost. Advantageously the computers are furnished with a gateway function. This function implies that the command computed by the master computer is sent to all the other computers. These all retransmit the command received to the remote controllers. Thus a redundancy is achieved in the transmission of the commands computed by the master computer and the risk of non-receipt of these commands by the remote controllers is minimized. Advantageously, to decrease the risk of using an erroneous command on account of a problem with the operation of this gateway function, when the communication with the master computer is lost, the median value of the command values received via the gateway functionality is selected. Advantageously, when furnished with two or fewer items of control information via the gateway functionality, it is considered that the item of information is not available and the actuator is invalidated and switches to damped mode.

The remote controllers being designed according to a command/monitor architecture, advantageously the various computations and selections carried out by these controllers according to the embodiments of the invention are consolidated according to the command/monitor mechanism already described. Thus the reliability of the decisions taken by these controllers is enhanced, more particularly the selection of the master computer and consequently of the command to be applied.

In the prior art, the normal law is aimed at servocontrolling a flight parameter of the aircraft such as the load factor, the trim, the roll rate or the like to a setpoint emanating from the order of the pilot or the automatic pilot. With the aim of improving the precision of such servocontrol, integrators are installed within the control pathways of the computers, so as to cancel the static error. Each computation unit carries out its own servocontrol. A computation unit is called the master of the servocontrol if it is the single unit which sees its servocontrol be effectively carried out by the aircraft. For this unit, the order which is computed is performed by the aircraft and hence the servocontrol is fed back and it converges. A unit is called a slave of the servocontrol if it is one of the set of non-master units for which the servocontrol carried out is not applied to the aircraft. These serve merely to monitor the master or to "take over" control of the aircraft in case of a fault with the master.

There may be discrepancies of servocontrol input, fault-free, between the units due, for example, to asynchronism, sampling, the use of distinct sources. Since the servocontrol of the slave unit is not executed, it is in open loop, and as it comprises integrators, the latter may end up drifting. To alleviate this divergence of the integrators of the slave units, said integrators are synchronized to the outputs of the integrators of the master unit. The gain in the synchronization is chosen wisely, neither too low so as not to let the outputs drift and inadvertently trigger the monitoring, nor too high, the risk then being that the fault will no longer be detected when it occurs.

Indeed, the innovative architecture proposed is a profound break from the existing architecture. The mechanism for synchronizing the integrators must be adapted to this new configuration.

Figure 4:
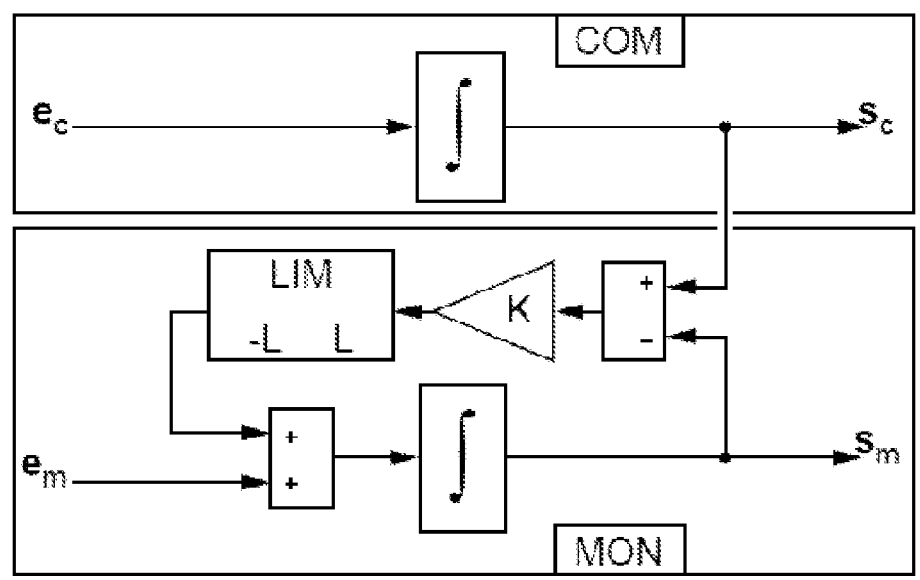
FIG. 4 illustrates a known method of synchronizing the integrators.

Advantageously, the control computer of the master pair sends the output of its integrator to the other computers. The other primary computers then synchronize their own integrators to that of the master computer. This synchronization can be done, for example, according to the known method illustrated in FIG. 4. It should be noted that each computer computes a normal law with integrator on behalf of two command/monitor pairs. Each computer, of which the master computer therefore maintains two integrators. The two integrators must be synchronized with the integrator of the master computer. Particularly, the integrator used by the master computer during its computation on behalf of the pair where it plays a monitor role must be synchronized with the integrator of the same computer used in command mode.

Naturally, to satisfy specific requirements, a person skilled in the field of the invention may apply modifications in the above description.

Although the present invention has been described above with reference to specific embodiments, the present invention is not limited to the specific embodiments, and the modifications will be obvious to a person versed in the art finding themselves in the field of application of the present invention.

The invention claimed is:

1. A computer for computing flight commands within a flight control system, the computer comprising:
    at least one item of software for computing flight commands according to at least one flight law on the basis of at least one command received from at least one piloting member;
    a communication network device with at least two separately associated computers of the same type;
    a first computing unit for computing a first flight order, intended for a remote controller of an airfoil actuator, in command mode within a first virtual command/monitor pair comprising said computer and one of the at least two separately associated computers acting in monitor mode on behalf of said first virtual command/monitor pair;
    a separate, second computing unit for computing a second flight order, intended for a remote controller of an airfoil actuator, in monitor mode within a second virtual command/monitor pair comprising said computer and the other of the at least two separately associated computers acting in command mode on behalf of said second virtual command/monitor pair,
    wherein each flight order is computed at least twice by said first and second computing units, a first time in command mode by said first computing unit, and a second time in monitor mode by said second computing unit, for achieving software dissimilarity.

2. The computer according to claim 1, further comprising a verifier for verifying the validity of the virtual command/monitor pairs according to the following criteria:
    the commands computed by the two computers of the pair are available and computed according to the same flight law; and
    the difference in absolute value between the two commands computed is less than a given tolerance threshold.

3. The computer according to claim 2, wherein the verifier for verifying the validity of the virtual command/monitor pairs furthermore:
    that the two computers implement a different item of software for the computation of the commands.

4. The computer according to claim 1, further comprising a first transmitter for transmitting to all the other computers of the system, and for each of the pairs in which it participates, its information regarding validity of the pair.

5. The computer according to claim 4, further comprising:
    an elector for electing a master pair from among the set of computers participating in the flight control system.

6. The computer according to claim 5, wherein the pair elected master is the first valid pair, determined as valid by the two computers of the pair, in a list of all the pairs of the system, ranked in an order of priority.

7. The computer according to claim 5, further comprising:
    if it is the computer acting in command mode of the pair elected master, a third transmitter for transmitting the commands computed to the whole set of computers;
    a retransmitter for retransmitting to the remote controller controlling an actuator, the commands received calculated by the computer acting in command mode of the pair elected master.

8. The computer according to claim 5, further comprising:
    if it is the computer acting in command mode of the pair elected master, a fourth transmitter for transmitting the output of an integrator used for the computation of the normal law;
    a synchronizer for synchronizing the integrators used for the computation of the normal law in command mode for a pair not elected master or in monitor mode to the value of the integrator of the computer acting in command mode of the pair elected master.

9. The computer according to claim 1, further comprising:
    a selector for selecting a level of flight law for the pair as being the most degraded level of law of the best levels of law of which the two computers of the pair are capable.

10. The computer according to claim 9, further comprising:
    a second transmitter for transmitting the level of law selected for each of the pairs in which it participates to all the computers;
    and where an elector elects a master pair having the least degraded law in a list of all pairs of the system, ranked in an order of priority.

11. The computer according to claim 1, further comprising:
    a reconfigurator for switching from a first item of software to a second different item of software for the computation of the flight commands.

12. The computer according to claim 1, wherein said first and second computing units are made of a simplex type having a single processing unit.

13. A controller of an airfoil actuator within a flight control system, the controller comprising:
- a first receiver for receiving from each computer of a set of computers organized as command/monitor pairs, the command computed by said computer and the result of the election of a pair as a master pair;
- a determiner for determining, from among the election results received, the master pair viewed by said controller;
- a first applier for applying to the airfoil, the command received by the computer acting in command mode within the master pair viewed by said controller;
- a first computing unit for computing a first flight order, intended for a remote controller of an airfoil actuator, in command mode within a first virtual command/monitor pair comprising said computer and one of at least two separately associated computers acting in monitor mode on behalf of said first virtual command/monitor pair; and
- a separate, second computing unit for computing a second flight order, intended for a remote controller of an airfoil actuator, in monitor mode within a second virtual command/monitor pair comprising said computer and the other of the at least two separately associated computers acting in command mode on behalf of said second virtual command/monitor pair,
- wherein each flight order is computed at least twice by said first and second computing units, a first time in command mode by said first computing unit, and a second time in monitor mode by said second computing unit, for achieving software dissimilarity.

14. The controller according to claim 13, wherein the determiner for determining the master pair comprises a selector for selecting the master pair most often cited in the election results received, an order of priority deciding between possible equally ranking pairs.

15. The controller according to claims 13, further comprising:
- a second receiver for receiving the commands computed by the computer acting in command mode within the master pair on the part of each of the computers; and
- a second applier for applying to the actuator the command thus received from one of the other computers in case of loss of connection with the computer acting in command mode within the master pair.

16. The controller according to claim 15, wherein the command applied is a median value of the commands thus received from the other computers in case of loss of connection with the computer acting in command mode within the master pair.

17. The controller according to claims 13, wherein the controller comprises two units forming a command/monitor pair.

18. The controller according to claim 13, wherein said first and second computing units are made of a simplex type having a single processing unit.

19. A flight control system comprising at least one computer, the system comprising:
- at least one item of software for computing flight commands according to at least one flight law on the basis of at least one command received from at least one piloting member;
- a communication network device with at least two separately associated computers of the same type;
- a first computing unit for computing a first flight order, intended for a remote controller of an airfoil actuator, in command mode within a first virtual command/monitor pair comprising said computer and one of the at least two separately associated computers acting in monitor mode on behalf of said first virtual command/monitor pair;
- a separate, second computing unit for computing a second flight order, intended for a remote controller of an airfoil actuator, in monitor mode within a second virtual command/monitor pair comprising said computer and the other of the at least two separately associated computers acting in command mode on behalf of said second virtual command/monitor pair,
- wherein each flight order is computed at least twice by said first and second computing units, a first time in command mode by said first computing unit, and a second time in monitor mode by said second computing unit, for achieving software dissimilarity;
- and at least one controller of an airfoil actuator wherein the controller comprises two units forming a command/monitor pair.

20. The system according to claim 19, wherein said first and second computing units are made of a simplex type having a single processing unit.

* * * * *